US012741587B2

(12) United States Patent
Hwang

(10) Patent No.: US 12,741,587 B2
(45) Date of Patent: Sep. 22, 2026

(54) APPARATUS FOR LAMP OF VEHICLE

(71) Applicant: HYUNDAI MOBIS CO., LTD., Seoul (KR)

(72) Inventor: Hyun Chang Hwang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 35 days.

(21) Appl. No.: 18/959,862

(22) Filed: Nov. 26, 2024

(65) Prior Publication Data

US 2025/0229705 A1 Jul. 17, 2025

(30) Foreign Application Priority Data

Jan. 15, 2024 (KR) ........................ 10-2024-0006069

(51) Int. Cl.

| | |
|---|---|
| ***B60Q 1/50*** | (2006.01) |
| ***F21S 41/153*** | (2018.01) |
| ***F21S 41/65*** | (2018.01) |
| ***F21S 43/00*** | (2018.01) |
| ***F21S 43/14*** | (2018.01) |
| ***F21W 103/20*** | (2018.01) |
| ***F21W 103/60*** | (2018.01) |
| ***F21Y 115/10*** | (2016.01) |

(52) U.S. Cl.

CPC ............. *B60Q 1/549* (2022.05); *B60Q 1/503* (2013.01); *F21S 41/153* (2018.01); *F21S 41/65* (2018.01); *F21S 43/14* (2018.01); *F21S 43/601* (2024.05); *B60Q 2400/20* (2013.01); *F21W 2103/20* (2018.01); *F21W 2103/60* (2018.01); *F21Y 2115/10* (2016.08)

(58) Field of Classification Search

CPC ......... B60Q 1/549; B60Q 1/503; F21S 43/14; F21S 43/601; F21S 41/65; F21S 41/153

See application file for complete search history.

(56) References Cited

U.S. PATENT DOCUMENTS

| | | | | |
|---|---|---|---|---|
| 7,653,215 B2 * | 1/2010 | Stam | ...................... | B60Q 1/085 382/104 |
| 12,191,429 B2 * | 1/2025 | Yoshida | ................ | F21S 41/176 |
| 12,196,385 B2 * | 1/2025 | Kim | ...................... | F21S 41/148 |
| 12,504,141 B2 * | 12/2025 | Gatsios | ................. | F21S 41/143 |
| 2025/0109832 A1 * | 4/2025 | Engler | .................. | F21S 41/153 |

* cited by examiner

*Primary Examiner* — Matthew J. Peerce

(74) *Attorney, Agent, or Firm* — NovoTechIP International PLLC

(57) ABSTRACT

A vehicle lamp apparatus according to an embodiment may include an actuator unit for the optic control of the vehicle lamp; a light source unit arranged near the actuator unit; and a control unit controlling light emission from at least some areas in the light source unit based on a control or pattern.

6 Claims, 11 Drawing Sheets

APPARATUS FOR LAMP OF VEHICLE

CROSS-REFERENCE TO RELATED APPLICATIONS

The present application claims priority to Korean Patent Application No. 10-2024-0006069, filed Jan. 15, 2024, the entire contents of which is incorporated herein for all purposes by this reference.

TECHNICAL FIELD

An embodiment of the present invention relates to an apparatus and method for a vehicle lamp, and more particularly, to a micro-linear actuator-based 3D customizable pixel lighting.

BACKGROUND

With advancements in lighting technologies such as LEDs, there have been attempts to install diverse lighting options in vehicles through car tuning. However, these installations often merely serve ambiance purposes and fail to address the needs of vehicle users. In addition, there are issues with the indiscriminate installation of lights such as disruptions to the driving of the vehicles having such installations or other neighboring vehicles. Therefore, a vehicle lamp apparatus is proposed to address these issues.

SUMMARY

According to an embodiment, a vehicle lamp apparatus may include an actuator unit for performing an optic control of the vehicle lamp, a light source unit arranged near or disposed adjacent to the actuator unit, and a control unit controlling the light emission from at least some areas in the light source unit based on control or pattern.

The vehicle lamp apparatus may further include an optic unit that reflects or refracts the light emitted from the light source unit.

The control unit may further include a control signal reception unit receiving control signals from a user terminal.

The control unit may control the lamp length through the actuator at the coordinates specified by a control or pattern.

The control unit may control the illumination color of the light source unit at the coordinates specified by the control or pattern.

The control unit may control the activation status of the light source unit at coordinates specified by the control or pattern.

According to an embodiment, a method for a vehicle lamp apparatus may include selecting a lamp mode of the vehicle lamp and controlling the light emission from at least some areas in the light source based on control or pattern, wherein an actuator for the optic control of the vehicle lamp may be used in the controlling of the light emission and the light source may be arranged near or disposed adjacent to the actuator.

The method for the vehicle lamp may further include determining whether the vehicle is driving and determining whether the control is performed remotely or manually.

The method for the vehicle lamp may further include receiving the input of pixel patterns generated by the user.

The controlling may further include controlling of extending or reducing the optic length relative to the light source using the actuator.

DETAILED DESCRIPTION

Figure 1:
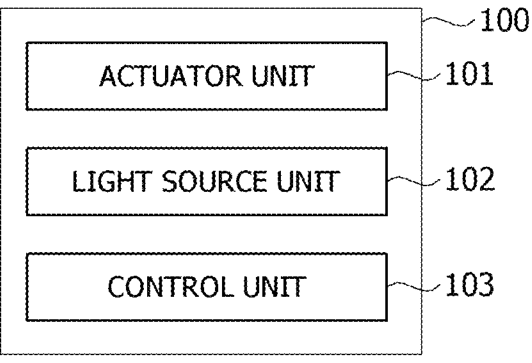
FIG. 1 is a block diagram of a vehicle lamp apparatus according to an embodiment.

Preferred embodiments of the present invention will be described with reference to the accompanying drawings below.

However, the technical ideas of the present invention are not limited to some embodiments described. The technical ideas may be implemented in a variety of different forms, and one or more of its components may be selectively combined, and substituted within the scope of the technical ideas of the present invention.

In addition, terms (including technical and scientific terms) used in the embodiments of the present invention may be interpreted in accordance with the meaning generally understood by those skilled in the art to which the present invention pertains unless explicitly and specifically defined otherwise. The meaning of the commonly used terms, such as the terms defined in dictionaries, may be interpreted by considering the contextual meaning in the related art.

In addition, the terms used in the embodiments of the present invention are intended to describe the embodiments and are not intended to limit the present invention.

In the present specification, singular forms may include plural forms unless otherwise stated. The description "at least one (or, one or more) of A, B, and C" may include one or more of all possible combinations of A, B, and C.

In addition, terms such as first, second, A, B, (a), (b), and the like may be used in describing the components of the embodiments of the present invention.

These terms are intended solely to distinguish the components from other components and are not limited to the nature, sequence, or order of the components.

When a component is described as being "connected", "coupled", or "linked", the components may be not only directly "connected", "coupled", or "linked" to another component but also "connected", "coupled", or "linked" to another component with a third component interposed in between.

In addition, when a component is described as being formed or arranged "above or under" another component, this includes not only situations where the two components are in direct contact with each other but also situations where one or more components are formed or arranged between the two components. In addition, the expression "above or under" may also encompass upward or downward directions relative to a given component.

The embodiments will be described in detail with reference to the accompanying drawings below, but the same or corresponding components are assigned the same reference numerals regardless of the drawing numbers, and repetitive descriptions of these components are omitted.

FIG. 1 is a block diagram showing a vehicle lamp apparatus according to an embodiment.

According to the embodiment, a vehicle lamp apparatus 100 may include an actuator unit 101 configured to perform an optic control of the vehicle lamp, a light source unit 102 arranged near or disposed adjacent to the actuator unit, and a control unit 103 controlling the light emission from at least some areas in the light source unit based on a control or pattern.

Components of the vehicle lamp apparatus may include at least some of the following: mechanical parts, circuits, semiconductors, computing devices, memory, processors, and data transceivers. At least some of the components may be mechanically, physically, communicatively, or electrically connected to at least some other components.

According to an embodiment, the vehicle lamp apparatus may further include an optic unit (not shown) that reflects or refracts the light emitted from the light source unit. The light source unit may include light sources such as LEDs. The light source unit may be configured with a plurality of light sources/arrays or include a plurality of light sources/arrays.

According to an embodiment, the control unit 103 may further include a control signal reception unit (not shown) receiving control signals from a user terminal.

The control signal may include at least some of all the information such as data, images, colors, shapes, forms, lengths, and coordinates (x, y, z, etc.). The coordinates may indicate the position of individual light sources/elements among a plurality of light sources. The coordinates may indicate pixels.

According to an embodiment, the control unit 103 may control the lamp length through the actuator unit at the coordinates specified by the control or pattern.

According to an embodiment, the control unit 103 may control the illumination color of the light source unit at the coordinates specified by the control or pattern.

According to an embodiment, the control unit 103 may control the activation status of the light source unit at the coordinates specified by the control or pattern. The activation status may include an on-state and an off-state.

According to an embodiment, the vehicle lamp apparatus may include a plurality of pixel-shaped light sources arranged in a stepped configuration and having an independent front-to-rear gradient within the lamp, allowing users to freely customize the lamp illumination directly.

According to an embodiment, the vehicle lamp apparatus may enhance the perception of a user, who is a driver, through the embossing effect and three-dimensional movement.

According to an embodiment, with the development of lamps having LEDs in the form of a plurality of pixels and the increase in the number of users who value their individuality, the vehicle lamp apparatus has the effect of providing technology that may reflect the users' individuality.

According to an embodiment, the vehicle lamp apparatus may enable driver-to-driver signal communication through high-resolution image display and the embossed effects created by controlling the advance and retreat length of lamp elements.

According to an embodiment, the vehicle lamp apparatus may minimize the impact of ambient light level when embossed lamps are used in a daytime environment.

According to an embodiment, the vehicle lamp apparatus may clearly communicate the driver's intention and signals (appreciation, alert, etc.) previously unavailable by outputting intuitive images.

According to an embodiment, the vehicle lamp apparatus may adjust the light amount by turning on only a portion of the lamp instead of the entire lamp, thereby reducing energy consumption.

Figure 2:
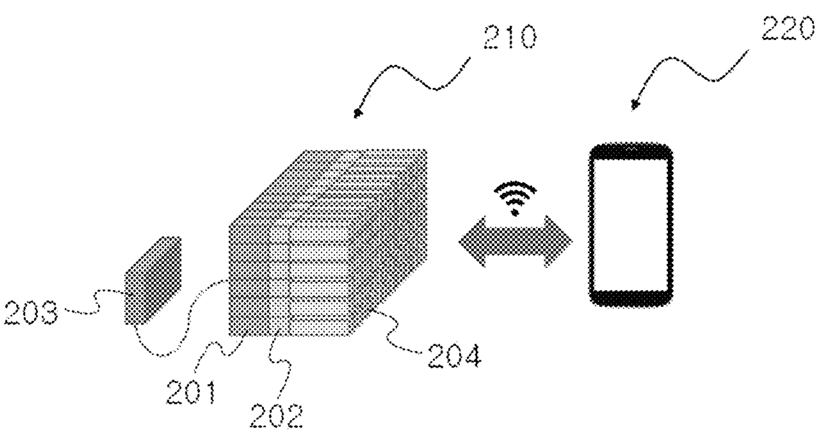
FIG. 2 is a diagram illustrating the main components of a vehicle lamp apparatus according to an embodiment.

FIG. 2 is a diagram showing the main components of a vehicle lamp apparatus according to an embodiment.

The vehicle lamp apparatus 210 may include an actuator unit 201 configured to perform the optic control of the vehicle lamp, a light source unit 202 arranged near or disposed adjacent to the actuator unit 201, a control unit 203 controlling the light emission from at least some areas in the light source unit based on control or pattern, and an optic unit 204 reflecting or refracting the light emitted from the light source unit 202.

At least some components of the vehicle lamp apparatus may include/use or provide an LED controller, a micro-linear actuator, an LED, a pixel optic, a pixel light, and a user application.

The actuator unit 201 may include a micro-linear actuator and the like. The actuator unit 201, serving as a drive unit for lamp optic control, may adjust the optics at the target coordinates through control length feedback.

The light source unit 202 may include LEDs. The light source unit 202 may be attached/arranged as a light-emitting diode at the end of the actuator and move together with the optics.

The optic unit 204 may include pixel optics. The optic unit 204 may diffuse the light from LEDs through reflection and refraction and be individually configured for each LED.

The control unit 203, serving as a controller controlling the actuator, may include an LED controller and the like. The control unit 203 may adjust the length of the driver and output LED colors according to an input image.

The user terminal 220 may include wireless devices owned by the user, such as smartphones and tablets, and include at least some computing devices.

The user terminal 220 may communicate with the vehicle lamp apparatus 210 by wireless communication and provide a user application. The user terminal 220 may provide a user interface for the user to control the lamp directly through an application. The height and color may be freely adjusted through the user terminal 220, and data transmission and reception from the control unit 203 such as a lamp controller may be executed via Wi-Fi.

Figure 3:
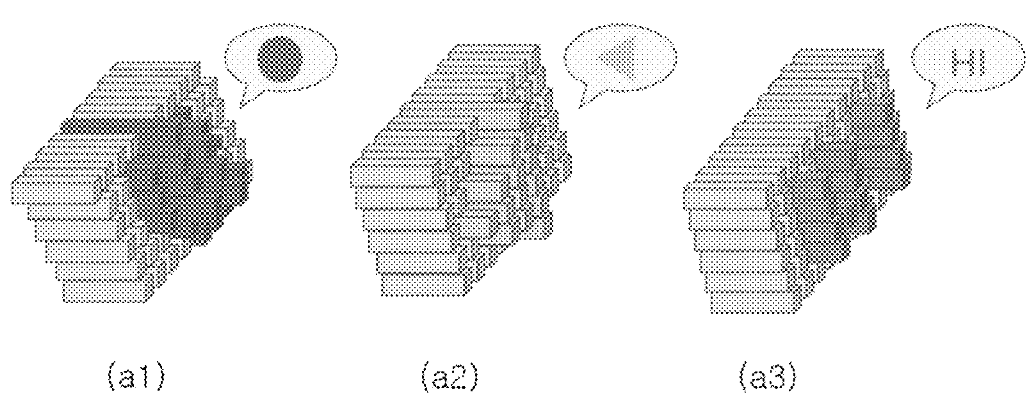
FIG. 3 is a diagram illustrating the concept of a vehicle lamp apparatus according to an embodiment.

FIG. 3 is a diagram illustrating the concept of a vehicle lamp apparatus according to an embodiment.

The vehicle lamp apparatus may adjust the lamp length through the actuator unit such as a linear actuator at the coordinates set based on image data input into/stored in/received by a control unit such as a controller (LDM) and activate the light source unit such as LEDs according to the input color.

In FIG. 3, (a1) shows that the vehicle lamp apparatus may provide the color/shape/form of the stop lamp. The color may be red, and the shape/form may be circular.

In FIG. 3, (a2) shows that the vehicle lamp apparatus may provide the color/shape/form of the turn signal. The color may be yellow, and the shape/form may be triangular.

In FIG. 3, (a3) shows that the vehicle lamp apparatus may provide color/shape/form of the communication signal. The color may be green, and the shape/form may be text/letters (for example, "HI").

Figure 4:
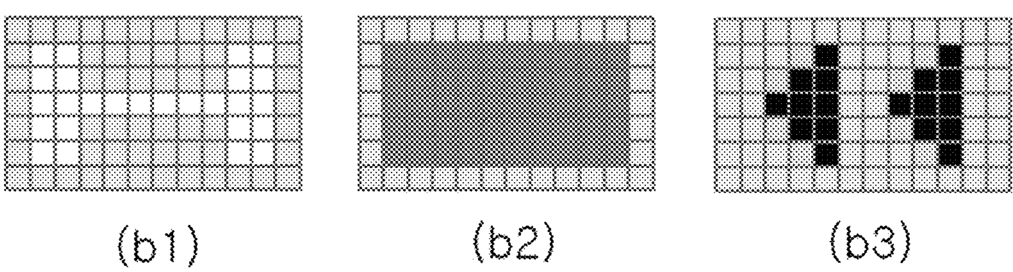
FIG. 4 is a diagram illustrating images of an activated vehicle lamp apparatus according to an embodiment.

FIG. 4 is a diagram illustrating images of the activated vehicle lamp apparatus according to an embodiment.

The vehicle lamp apparatus offers lamp customization based on scenarios for users. Image input may be processed based on the following lamp control scenarios when customizing the lamp according to the user's individuality:

1. The user inputs a 2D image (image when observed from the front of the lamp) data through a mobile application (user application),
2. Advance and retreat scenario (advance and retreat distance and operation time) for each pixel is input or a sample image/scenario in the mobile application is selected (direct control/mobile control), and
3. Input data-based scenario is executed.

The vehicle lamp apparatus may receive data/control signals transmitted to the LED controller through a mobile application and the like.

The vehicle lamp apparatus may transmit/receive and save the images suitable for the existing lamp functions (front-daytime running light (DRL), hi/low beam, turn, etc./rear-stop, turn, etc.) through the user's mobile application and output the images (to turn on at least some lamps corresponding to the control signal/data).

In FIG. 4, (b1) shows a DRL light (front). The dimensions may be (x: 1, y: 1, z: 20 mm), (x: 2, y: 1, z: 20 mm), and so on, where z may represent advance length. The color may be (x: 1, y: 1, R: 255, G: 255, B: 255), (x: 2, y: 1, R: 255, G: 255, B: 255), and so on.

In FIG. 4, (b2) shows a stop light (rear). The dimensions may be (x: 1, y: 1, z: 20 mm), (x: 2, y: 1, z: 20 mm), and so on. The color may be (x: 1, y: 1, R: 255, G: 0, B: 0), (x: 2, y: 1, R: 255, G: 0, B: 0), and so on.

In FIG. 4, (b3) shows a left turn light (rear). The dimensions may be (x: 4, y: 1, z: 20 mm), (x: 9, y: 1, z: 20 mm), and so on. The color may be (x: 4, y: 1, R: 244, G: 149, B: 29), (x: 9, y: 1, R: 244, G: 149, B: 29), and so on.

Figure 5:
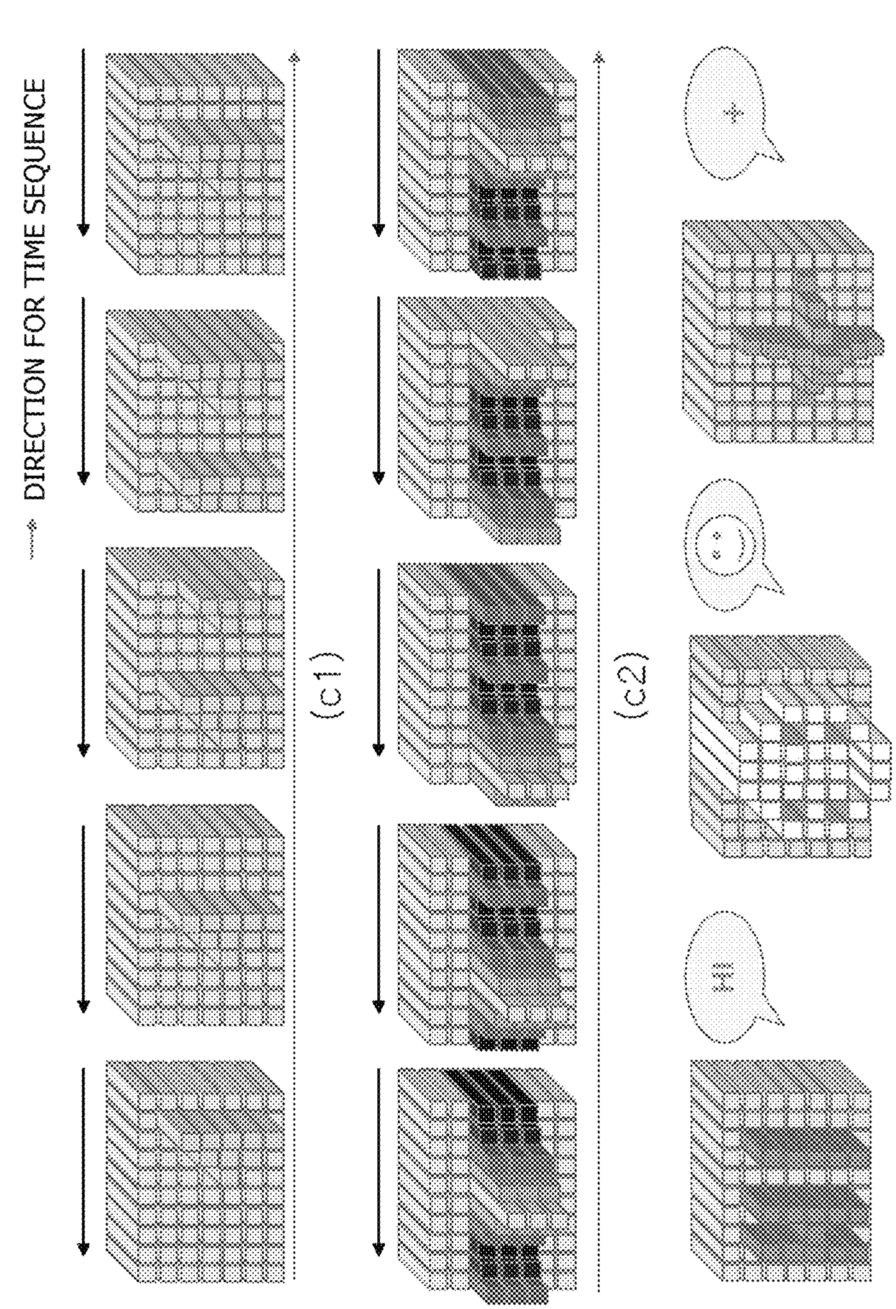
FIG. 5 is a diagram illustrating scenarios for a vehicle lamp apparatus according to an embodiment.

FIG. 5 is a diagram illustrating scenarios for the vehicle lamp apparatus according to an embodiment.

The vehicle lamp apparatus may provide operation scenarios.

In FIG. 5, (c1) shows that the vehicle lamp apparatus may provide a turn signal scenario.

In FIG. 5, (c2) shows that the vehicle lamp apparatus may provide a wave (DWL) scenario.

In FIG. 5, (c3) shows that the vehicle lamp apparatus may provide other function scenarios.

The vehicle lamp apparatus may arrange the signals at different heights to enhance the aesthetic appeal.

Figure 6:
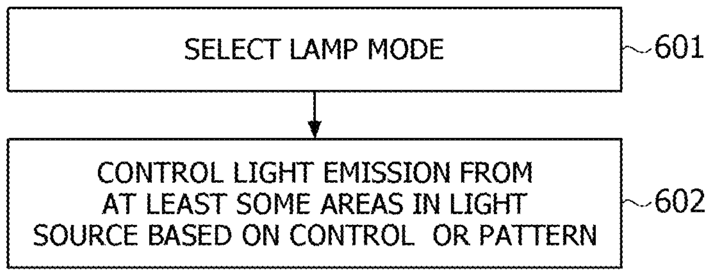
FIG. 6 is a flowchart showing a method for a vehicle lamp according to an embodiment.

FIG. 6 is a flowchart showing a method for a vehicle lamp apparatus.

According to an embodiment, each step of the method for a vehicle lamp apparatus may be executed by at least some components of the vehicle lamp apparatus.

In step 601, the vehicle lamp apparatus may select a lamp mode of the vehicle lamp.

In step 602, the vehicle lamp apparatus may control the light emission from at least some areas in the light source based on control or pattern.

The vehicle lamp apparatus may use an actuator configured to perform the optic control of the vehicle lamp, and the light source may be arranged near or disposed adjacent to the actuator.

According to an embodiment, the vehicle lamp apparatus may determine whether the vehicle is driving and determine whether the control is performed remotely or manually.

According to an embodiment, the vehicle lamp apparatus may receive an input of pixel patterns generated by the user.

According to an embodiment, the vehicle lamp apparatus may control to extend or reduce the optic length relative to the light source using the actuator.

Figure 7:
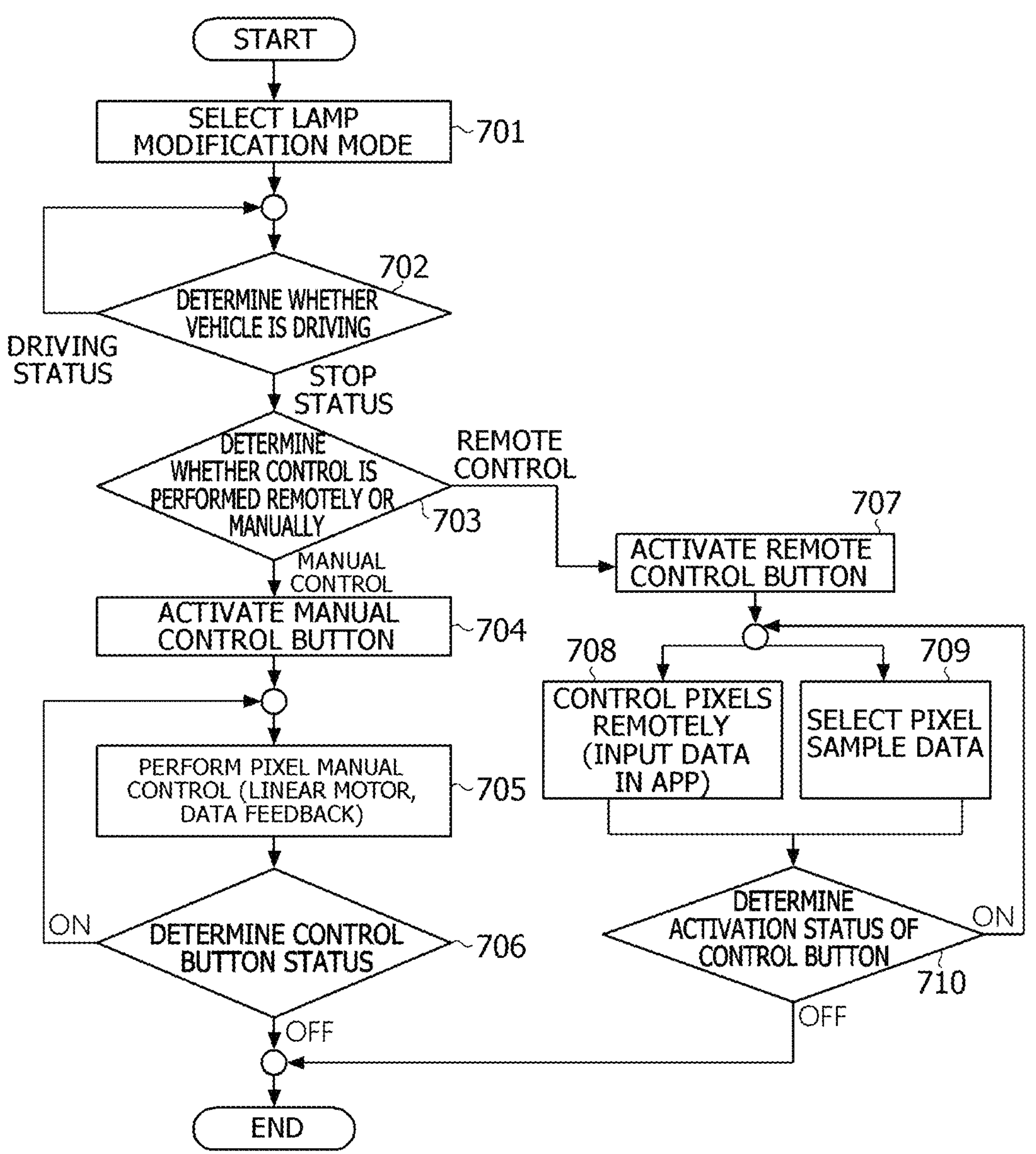
FIG. 7 shows a flow of a method for a vehicle lamp according to an embodiment.

FIG. 7 shows a flow of a method for a vehicle lamp according to an embodiment.

In step 701, the vehicle lamp apparatus may select/provide a lamp modification mode.

In step 702, the vehicle lamp apparatus may determine whether the vehicle is driving or stopped.

In step 703, the vehicle lamp apparatus may determine whether control is performed remotely or manually when the vehicle is stopped.

In step 704, the vehicle lamp apparatus may activate or turn/switch on a manual control button. The vehicle lamp apparatus may check whether the manual control button is activated or turned/switched on.

In step 705, the vehicle lamp apparatus may perform manual control of pixels (linear motor, data feedback).

In step 706, the vehicle lamp apparatus may determine/perform the operation/status of the control button.

When the control button is activated, the vehicle lamp apparatus may repeat step 705. When the control button is deactivated, the vehicle lamp apparatus may terminate the operation.

In step 707, the vehicle lamp apparatus may activate or turn/switch on the remote control button. The vehicle lamp apparatus may check whether the remote control button is activated or turned/switched on.

In step 708, the vehicle lamp apparatus may perform remote control of pixels (data input into an app).

In step 709, the vehicle lamp apparatus may select pixel sample data.

In step 710, the vehicle lamp apparatus may repeat step 708 or 709 when the control button is activated or turned/switched on. When the control button is deactivated or turned/switched off, the vehicle lamp apparatus may terminate the operation.

Figure 8:
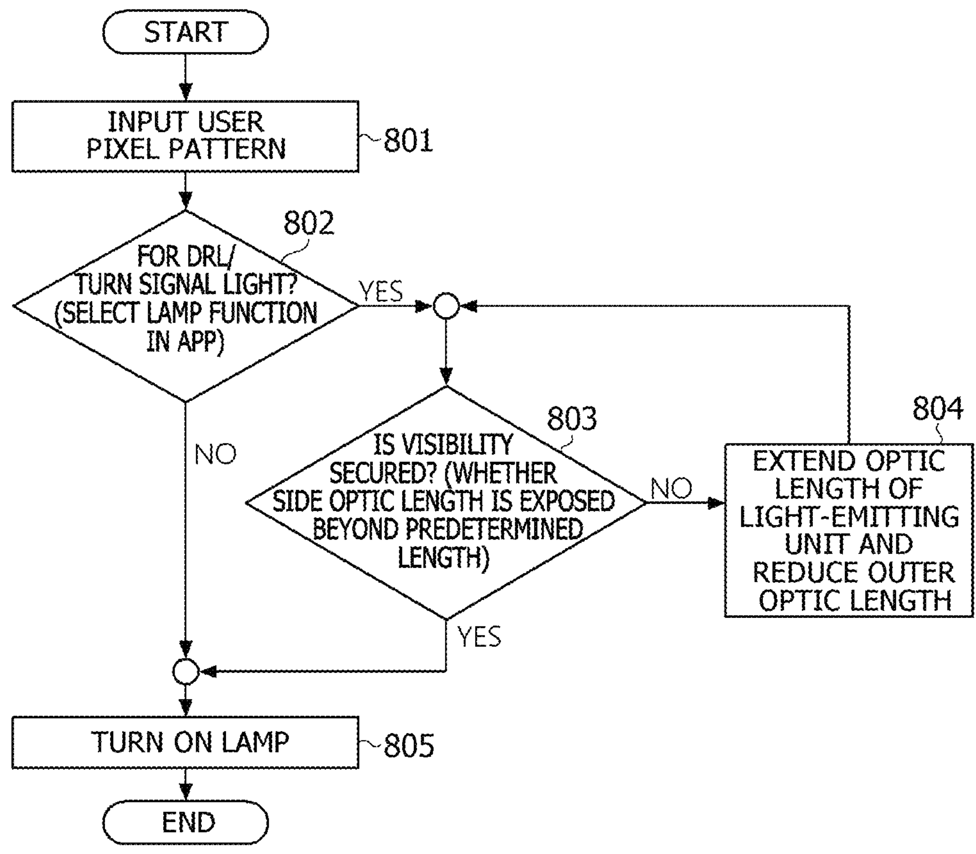
FIG. 8 is a diagram showing an automatic control of a method for a vehicle lamp according to an embodiment.

FIG. 8 is a diagram illustrating an automatic control of the method for a vehicle lamp apparatus according to an embodiment.

The device for a vehicle lamp can provide a function to automatically control DRL/turn signals based on customizable lamp regulations to secure the lateral visibility of the vehicle.

In compliance with regulations requiring lateral visibility, the vehicle lamp apparatus may perform an automatic correction operation to ensure visibility when DRL is selected among the lamp functions in the app. Linear actuators may fine-tune the control through length feedback.

In step 801, user pixel patterns may be input/received in the vehicle lamp apparatus.

In step 802, the vehicle lamp apparatus may determine/check whether the received pattern is for a DRL/turn signal (selection of a lamp function in the app).

In step 803, the vehicle lamp apparatus may determine/check whether visibility is secured (whether the side optic length is exposed beyond a certain length) when it is determined that the received pattern is for a DRL/turn signal.

In step 804, the vehicle lamp apparatus may extend the optic length of the light source unit (light emitting unit) and reduce the length of outer optics when visibility is not secured.

In step 805, the vehicle lamp apparatus may turn on the lamp (when visibility is secured).

The vehicle lamp apparatus may provide automatic visibility-securing operations to extend the optic length of the light source unit (light emitting unit) or reduce the length of the outer optics (by control).

Figure 9:
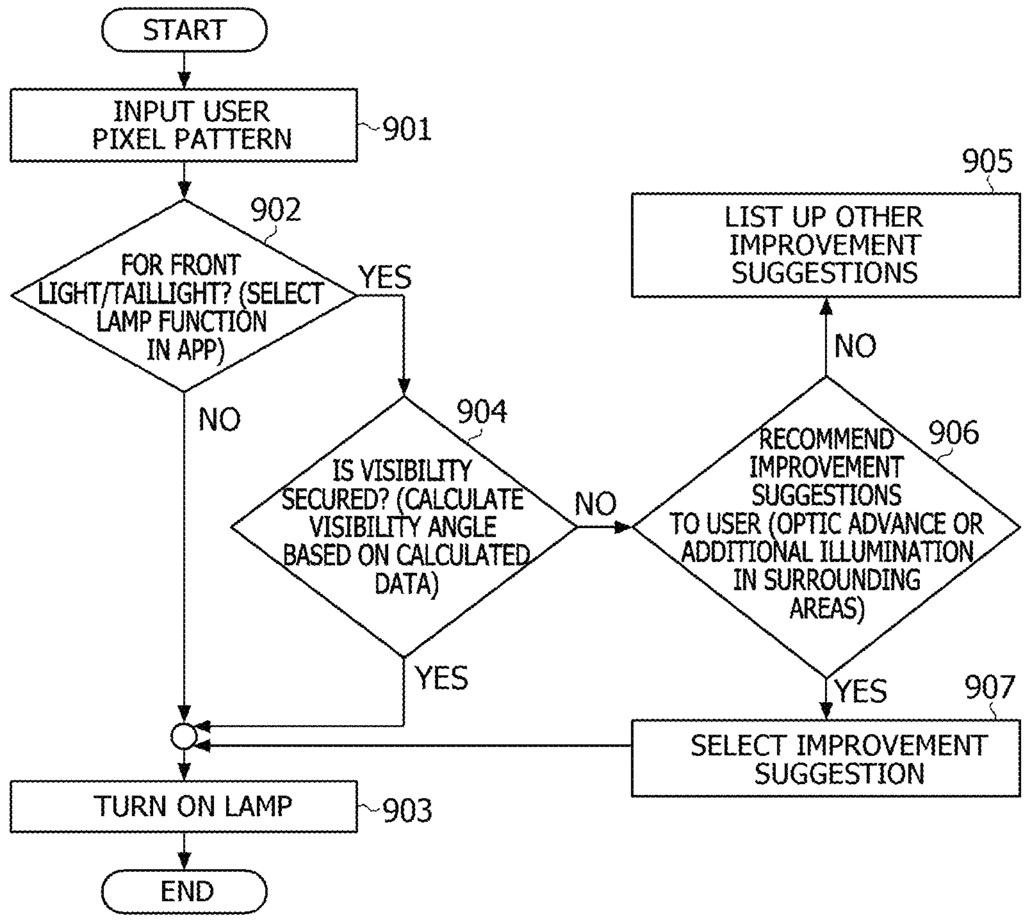
FIG. 9 is a diagram showing an automatic illumination angle adjustment control in a method for a vehicle lamp according to an embodiment.

FIG. 9 is a diagram showing the automatic adjustment control of the illumination angle in the method for a vehicle lamp apparatus according to an embodiment.

The vehicle lamp apparatus may provide an automatic adjustment function for the headlight illumination angle based on a linear actuator to secure visibility beyond a certain area in compliance with regulations when turning on the lamp.

The vehicle lamp apparatus may advance optics or activate additional pixels automatically in compliance with the regulations when displaying images customized for the user.

In step 901, the user pixel patterns may be input/received in the vehicle lamp apparatus.

In step 902, the vehicle lamp apparatus may determine/check whether the received pixel pattern is for a headlight or taillight (selection of a lamp function in the app).

In step 903, the vehicle lamp apparatus may turn on the lamp (when visibility is secured).

In step 904, the vehicle lamp apparatus may determine/check whether visibility is secured when the received pattern is for a headlight/taillight (calculation of the viewing angle based on calculated data).

When no improvement suggestion is recommended/provided, the vehicle lamp apparatus may list up/provide alternative/other improvement suggestions in step 905.

When visibility is not secured, the vehicle lamp apparatus may recommend/provide improvement suggestions (advancing of optics or additional turning-on of surrounding areas) to the user in step 906.

In step 907, the vehicle lamp apparatus may select an improvement suggestion.

The vehicle lamp apparatus may secure the illumination angle by advancing the optics or illuminating additional surrounding areas.

Figure 10:
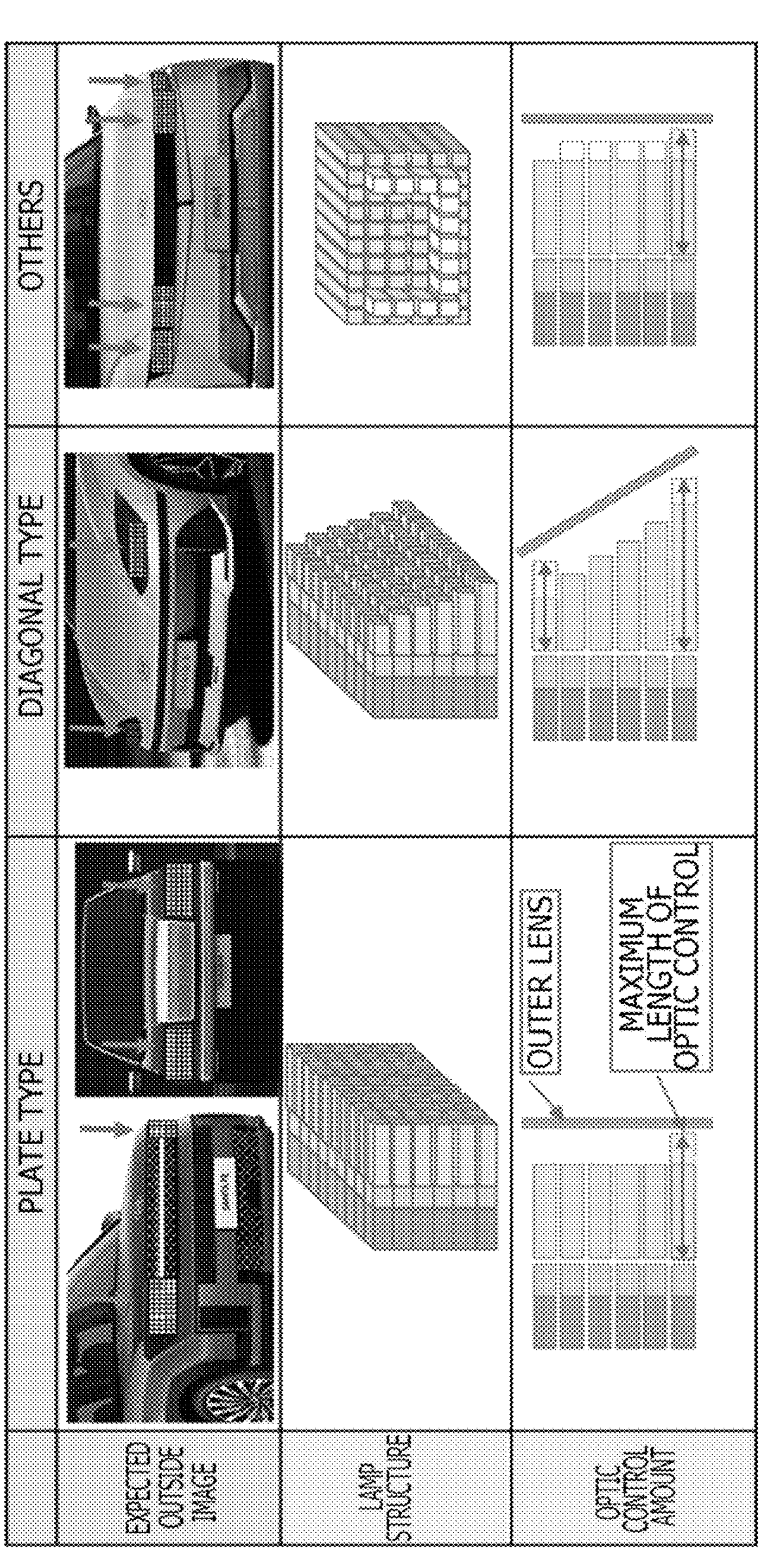
FIG. 10 is a diagram showing lamp modularizations of a vehicle lamp apparatus according to an embodiment.

FIG. 10 is a view illustrating lamp modularization of a vehicle lamp apparatus according to an embodiment.

The vehicle lamp apparatus may provide users with lamp customization using components such as micro-linear actuators, high-resolution LEDs, pixels, and the like.

3D control scenarios may be set remotely based on a mobile application for the vehicle lamp apparatus.

A micro-linear actuator-based manual control method for pixel advance/retreat length feedback may be provided for the vehicle lamp apparatus.

Differentiated lamp functions that allow direct user customization to express individuality may be provided for the vehicle lamp apparatus, thereby reducing lamp design costs.

The vehicle lamp apparatus may provide a three-dimensional presentation (emergency alerts, communication of driver's intentions (U-turn, appreciation, emergency, etc.)), thereby allowing more intuitive and diverse communication of intentions.

The vehicle lamp apparatus may control narrow areas (fewer pixels, stronger light) and wide areas (more pixels, weaker light) during high/low beam illumination through independent pixel control (the width of the light source of the lamp may be controlled for the same amount of light).

A differentiated lamp structure may be provided in the vehicle lamp apparatus, thereby resolving the issue of limited light source illumination angle when turning on some areas in the conventional pixel lamp and expanding the illumination angle.

The vehicle lamp apparatus may implement three-dimensional design and animation using precise length feedback control by a micro-linear actuator.

The vehicle lamp apparatus may provide a difference in illumination angle through an equal light amount-based light source width control and pixel gradient.

The vehicle lamp apparatus may provide design customization through lamp modularization and the like.

The vehicle lamp apparatus may implement module lamps applicable to various vehicle designs by modularizing the micro-linear actuators, LEDs, and pixel optics and allow diverse design presentations for different vehicle models by setting the initial length and maximum control amount with the same module during modularization.

The plate type in FIG. 10 shows that the maximum length control amount set for each actuator is the same.

The diagonal type in FIG. 10 shows that the maximum length control amount set for each actuator is different.

Other configuration in FIG. 10 shows the initial control amount for a specific pattern (the maximum control amount is the same).

Figure 11:
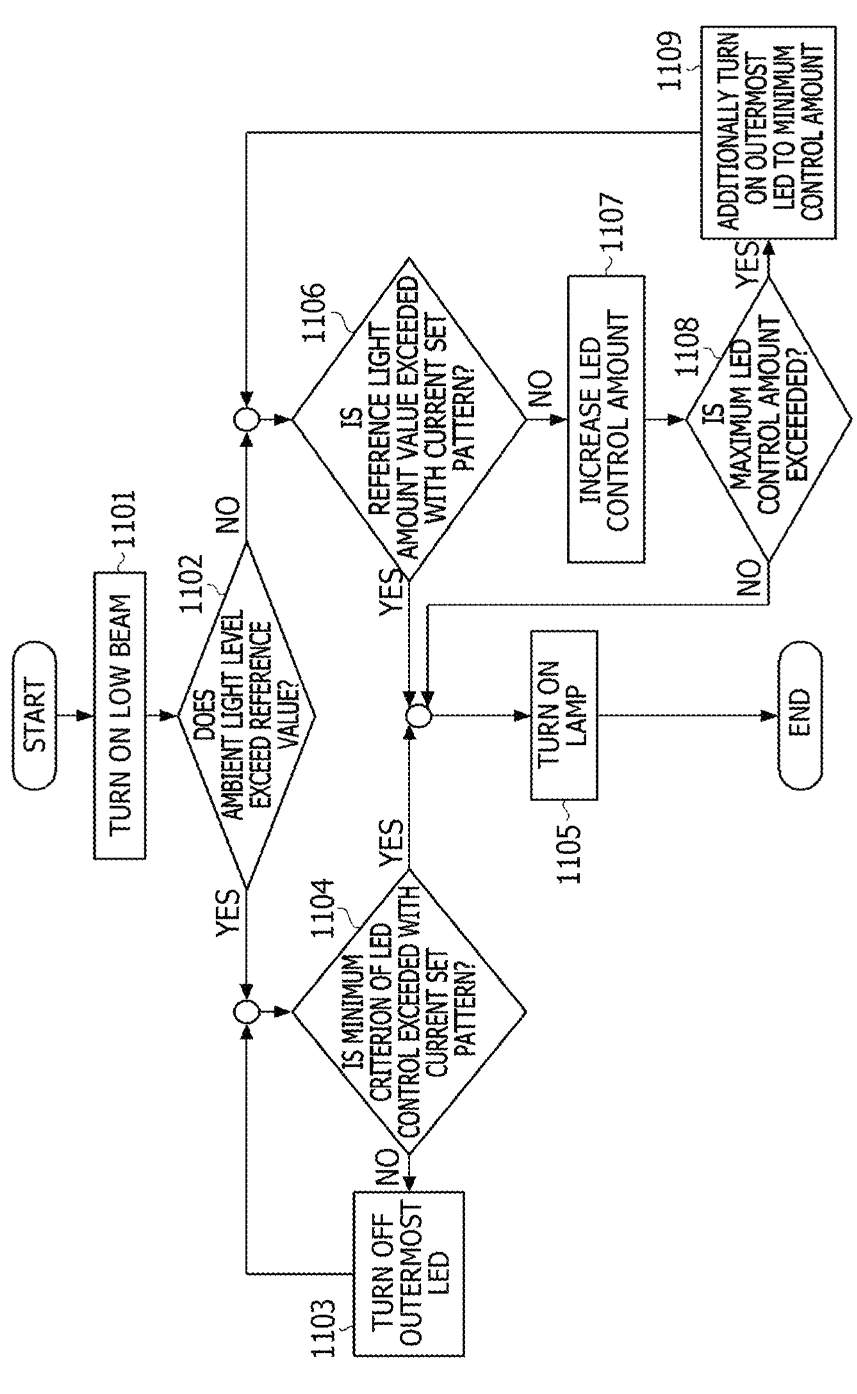
FIG. 11 is a diagram showing a light amount control in a method for a vehicle lamp according to an embodiment.

FIG. 11 is a diagram showing the light amount control in a method for a vehicle lamp according to an embodiment.

The vehicle lamp apparatus may have a light amount control function of the lamp. This function enables the vehicle lamp apparatus to measure the ambient light level, calculate the area and light amount of the pattern, calculate the optimal control amount, and output the calculated optimal control amount when turning on the low beam of the customized lamp.

The vehicle lamp apparatus may increase vehicle battery efficiency and LED efficiency.

In step 1101, the vehicle lamp apparatus may check whether the low beam is turned on or turn on the low beam.

In step 1102, the vehicle lamp apparatus may determine/check whether the ambient light level exceeds a reference value.

In step 1103, the vehicle lamp apparatus may control to turn off the outermost LEDs when the minimum LED control criterion is not met with the current set pattern.

In step 1104, the vehicle lamp apparatus may determine/check whether the minimum criterion of LED control is exceeded with the current set pattern when the ambient light level exceeds a reference value.

In step 1105, the vehicle lamp apparatus may turn on the lamp (when the minimum LED control criterion is exceeded with the current set pattern, or a reference light amount value is exceeded or the maximum LED control amount is not exceeded with the current set pattern).

In step 1106, the vehicle lamp apparatus may determine/check whether the reference light amount value is exceeded with the current set pattern when the ambient light level does not meet a reference value.

In step 1107, the vehicle lamp apparatus may increase the LED control amount when the reference light amount value is not met with the current set pattern.

In step 1108, the vehicle lamp apparatus may determine/check whether the maximum LED control amount is exceeded.

In step 1109, the vehicle lamp apparatus may additionally turn on the outermost LEDs to the minimum control amount when the maximum LED control amount is exceeded.

The term "unit" used in the present embodiment refers to software or hardware such as a field-programmable gate array (FPGA) or an application-specific integrated circuit (ASIC) and plays certain roles. However, a "unit" is not limited to software or hardware. A "unit" may be configured to be on an addressable storage medium or may be configured to execute one or more processors. Thus, for example, a "unit" may include components such as software components, object-oriented software components, class components, and task components, processes, functions, attributes, procedures, subroutines, segments of program code, drivers, firmware, microcode, circuits, data, database, data structures, tables, arrays, and variable. The functions provided within the components and "units" may be combined into a smaller number of components and "units" or may be further divided into additional components and "units". Further, the components and "units" may be implemented to execute one or more CPUs within a device or secure multimedia card.

The present invention is described with reference to the preferred embodiments above. However, those skilled in the art will understand that the present invention may be modified and changed in various manners within the scope not deviating from the ideas and scope of the present invention described in the scope of the following patent claim.

What is claimed is:

1. A vehicle lamp comprising:

a light source unit configured to emit light and including a plurality of light output areas respectively corresponding to a plurality of sets of coordinates;

an optic unit configured to refract the light emitted from the light source unit and including a plurality of pixel optics respectively disposed on the plurality of light output areas and corresponding to the plurality of sets of coordinates, each pixel optic configured to advance or retreat to adjust an optic length of each pixel optic with respect to the light source unit;

an actuator unit connected to and configured to control the light source unit and the optic unit; and a control unit connected to the actuator unit and configured to receive a control signal and control, through the actuator unit, light emission from at least one of the plurality of light output areas of the light source unit based on one or more sets of coordinates specified in the control signal and adjust, through the actuator unit, the optic length of at least one of the plurality of pixel optics based on one or more sets of coordinates specified in the control signal.

2. The vehicle lamp of claim 1, wherein the control unit further comprises a control signal reception unit configured to receive the control signal from a user terminal.

3. The vehicle lamp of claim 1, wherein the control unit is configured to control an illumination color of each of the plurality of light output areas.

4. The vehicle lamp of claim 1, wherein the control unit is configured to control an activation status of each of the plurality of light output areas based on one or more sets of coordinates specified in the control signal.

5. A method of controlling a vehicle lamp of a vehicle, the vehicle lamp comprising (1) a light source unit configured to emit light and having a plurality of light output areas respectively corresponding to a plurality of sets of coordinates, and (2) an optic unit configured to refract the light emitted from the light source unit and including a plurality of pixel optics respectively disposed on the plurality of light output areas and corresponding to the plurality of sets of coordinates, each pixel optic configured to advance or retreat to adjust an optic length of each pixel optic with respect to the light source unit, the method comprising:

receiving a control signal;

controlling light emission from each of the plurality of light output areas of the light source unit based on one or more sets of coordinates specified in a control signal; and adjusting the optic length of each of the plurality of pixel optics based on one or more sets of coordinates specified in the control signal.

6. The method of claim 5, wherein the control signal indicating a pixel patterns generated by a user.

* * * * *